US006851973B2

(12) United States Patent
Bigotto

(10) Patent No.: US 6,851,973 B2
(45) Date of Patent: Feb. 8, 2005

(54) ELECTRIC CONNECTOR WITH RELEASABLE RETAINER

(75) Inventor: Pier Carlo Bigotto, Cascine Vica-Rivoli (IT)

(73) Assignee: FCI, Paris (FR)

( * ) Notice: Subject to any disclaimer, the term of this patent is extended or adjusted under 35 U.S.C. 154(b) by 0 days.

(21) Appl. No.: 10/312,166

(22) PCT Filed: Jun. 19, 2001

(86) PCT No.: PCT/EP01/06922

§ 371 (c)(1), (2), (4) Date: Jul. 21, 2003

(87) PCT Pub. No.: WO01/99235

PCT Pub. Date: Dec. 27, 2001

(65) Prior Publication Data

US 2004/0029439 A1 Feb. 12, 2004

(30) Foreign Application Priority Data

Jun. 20, 2000 (IT) ................................ TO2000A000601

(51) Int. Cl.$^{7}$ .......................... H01R 13/73; H02B 1/01
(52) U.S. Cl. ...................................... 439/557; 439/248
(58) Field of Search ......................... 439/557, 247–248, 439/358, 923, 15, 164

(56) References Cited

U.S. PATENT DOCUMENTS 4,915,648 A 4/1990 Takase et al. ............... 439/490
5,733,135 A 3/1998 Kennedy et al. ............ 439/188
5,993,228 A * 11/1999 Kubota ....................... 439/164
6,012,947 A * 1/2000 Zann et al. ................. 439/557
2004/0029440 A1 * 2/2004 Bigotto ..................... 439/557

FOREIGN PATENT DOCUMENTS

DE 4439852 A1 5/1996
EP 0750369 A2 12/1996

* cited by examiner

*Primary Examiner*—Hae Moon Hyeon
(74) *Attorney, Agent, or Firm*—Perman & Green, LLP

(57) ABSTRACT

An electric connector (2) connectable to a first supporting member (4), cooperating with a complementary electric connector (3) in turn carried by a second supporting member (5), and connectable to the complementary connector (3) by connecting the first and second supporting member (4, 5) in an assembly direction (A); the connector (2) has an outer casing (20) defining at least one cavity (21) for housing a respective electric terminal (22), and has connecting means (32) for connection to the first supporting member (4) and in turn having limited-load retaining means (35) releasable by loads greater than the load required to connect the connector (2) and the complementary connector (3), so as to enable displacement of the casing (20) with respect to the first supporting member (4) in an opposite direction the assembly direction (A) in the event connection of the connector (2) to the complementary connector (3) is completed before the first and second supporting member (4, 5) are connected.

9 Claims, 4 Drawing Sheets

ELECTRIC CONNECTOR WITH RELEASABLE RETAINER

This application claims the benefit of the earlier filed International Application No. PCT/EP01/06922, International Filing Date, Jun. 19, 2001, which designated the United States of America, and which international application was published under PCT Article 21(2) as WO Publication No. WO 01/99235 A1.

TECHNICAL FIELD

The present invention relates to an electric connector of the type comprising an insulating casing defining a number of cavities for housing respective electric terminals.

The present invention may be used to advantage, though not exclusively, for automotive connections, to which the following description refers purely by way of example.

BACKGROUND ART

As is known, automotive electric connections sometimes call for connecting two electric connectors in turn connected, in use, to respective supporting members eventually connected to each other; in which case, the connectors are connected to each other by connecting the supporting members.

Any assembly tolerances of the supporting members may make it difficult to connect the connectors correctly in any assembly configuration of the supporting members.

DISCLOSURE OF INVENTION

It is an object of the present invention to provide an electric connector designed to eliminate the aforementioned drawback in a straightforward, low-cost manner.

According to the present invention, there is provided an electric connector connectable to a first supporting member, cooperating with a complementary electric connector in turn carried by a second supporting member, and connectable to the complementary connector by connecting said first and said second supporting member in an assembly direction; said connector comprising an outer casing defining at least one cavity for housing a respective electric terminal and having connecting means for connection to said first supporting member; characterized in that said connecting means comprise limited-load retaining means releasable by loads greater than the load required to connect said connector and the complementary connector, so as to enable displacement of said casing with respect to said first supporting member in an opposite direction to said assembly direction in the event connection of said connector to the complementary connector is completed before said first and said second supporting member are connected.

BRIEF DESCRIPTION OF THE DRAWINGS

A preferred, non-limiting embodiment of the present invention will be described by way of example with reference to the accompanying drawings, in which.

BEST MODE FOR CARRYING OUT THE INVENTION

Figure 1:
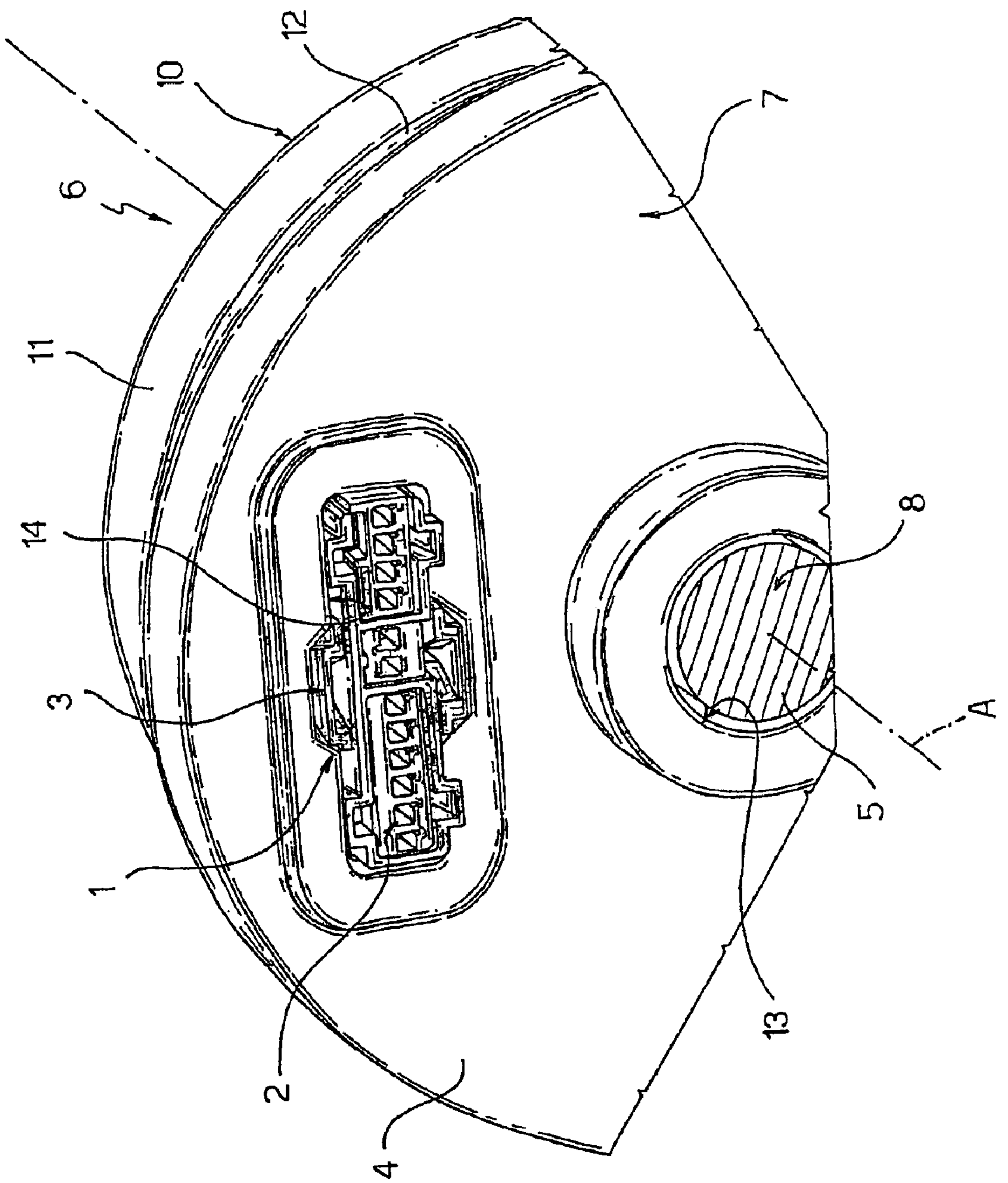
FIG. 1 shows a partial front view in perspective of a vehicle steering module featuring an electric connecting unit comprising an electric plug connector in accordance with the present invention, and a complementary electric jack connector.

Number 1 in FIG. 1 indicates as a whole an electric connecting unit comprising a plug connector 2 and a jack connector 3 carried by respective supporting members 4 and 5 and connected to each other by connecting supporting members 4, 5 in an assembly direction A.

In the example shown, unit 1 is incorporated in a vehicle steering module 6 defined by a steering wheel 7 and a steering column 8, which are connected coaxially to each other in a direction A, and component parts of which define supporting members 4 and 5 respectively. More specifically, steering wheel 7 and steering column 8, i.e. supporting members 4 and 5, are connected to each other with predetermined assembly tolerances both in direction A and angularly with respect to direction A.

Unit 1 is used to connect a number of known electric devices (not shown), normally located on the vehicle steering wheel 7 (horn, air-bag, radio control members, etc.), to a flexible circuit 9 with parallel conductive tracks, commonly known as a "flat cable", coiled about steering column 8 and housed in a box body 10 (only shown partly in FIGS. 1 and 5) defined by a fixed, substantially cylindrical base member 11, and by a circular rotary plate 12 integral with steering column 8.

Supporting member 4, defined in the example shown by a substantially circular base disk of steering wheel 7, comprises a central through hole 13 engaged by a complementary end portion of steering column 8; and a peripheral through opening 14 having a substantially rectangular round-cornered lateral edge and engaged in use by connector 2.

Said end portion of steering column 8 defines, in the example shown, supporting member 5, and engages in angularly fixed manner a central through hole 15 (FIG. 5) in plate 12 of box body 10. Plate 12 is advantageously made of plastic material and integrally with connector 3.

Figure 2:
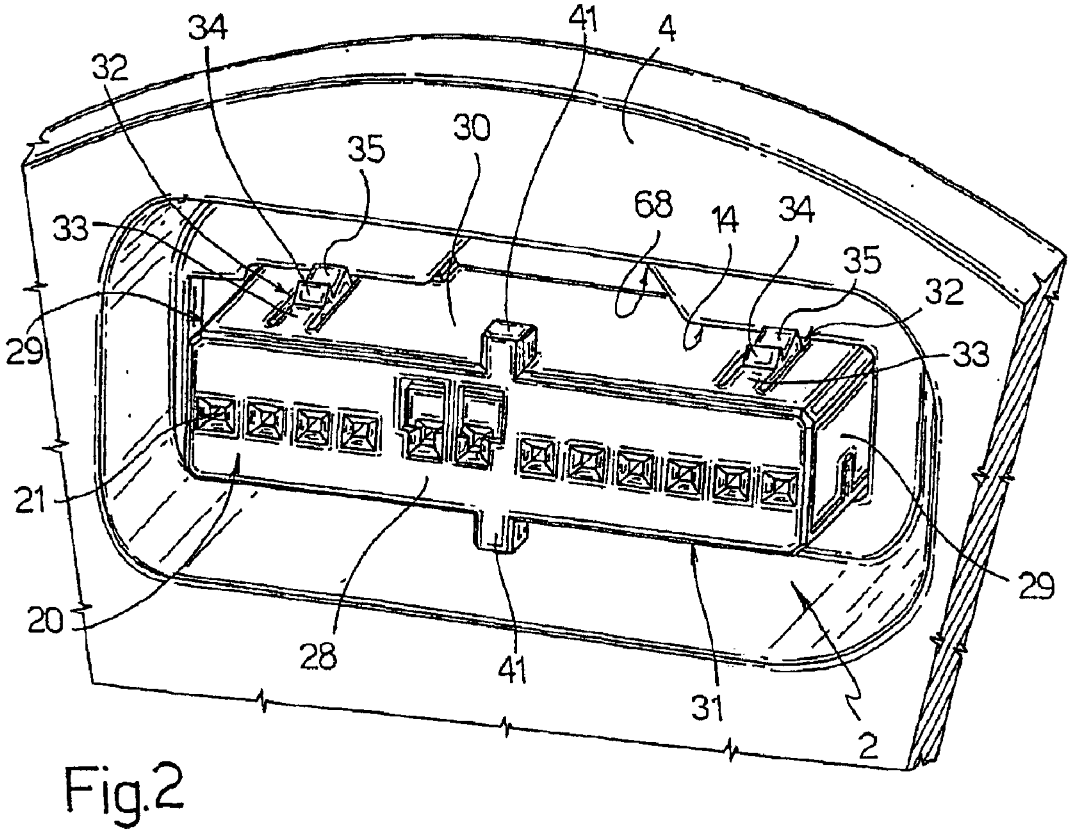
FIG. 2 shows a larger-scale front view in perspective of the FIG. 1 plug connector prior to connection to the jack connector.
Figure 3:
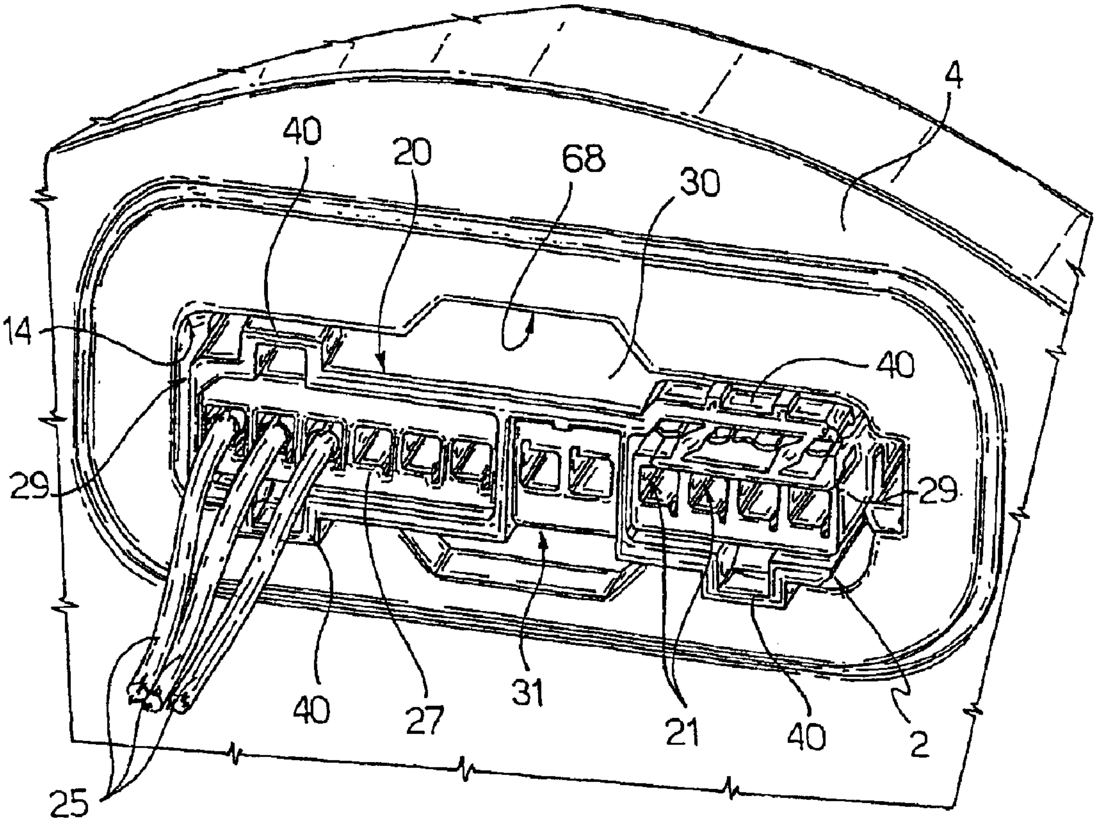
FIG. 3 shows a rear view in perspective of the FIG. 2 plug connector.
Figure 4:
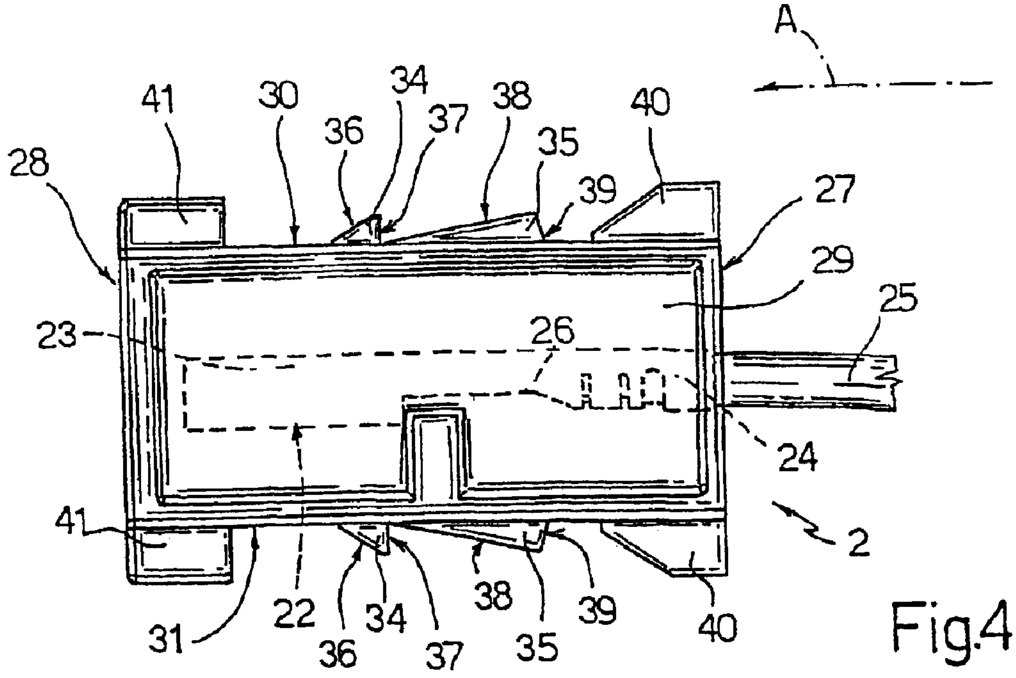
FIG. 4 shows a side view of the FIG. 2 plug connector.

With reference to FIGS. 2 to 4, connector 2 comprises a substantially parallelepiped-shaped insulating casing 20 defining a number of longitudinal through cavities 21 having respective axes parallel to direction A and for receiving respective female electric terminals 22 retained inside cavities 21 by known retaining means not shown by not forming part of the present invention.

More specifically, each terminal 22 (FIGS. 3 and 4) comprises in known manner a box-shaped contact portion 23; a connecting portion 24 for connection to a respective electric cable 25; and an intermediate portion 26 connecting portions 23 and 24.

Cavities 21 are aligned in one row crosswise to direction A. Casing 20 is defined by a rear wall 27 from which electric cables 25 project; by a front wall 28 facing contact portions 23 of terminals 22; by two opposite lateral walls 29 parallel to direction A and perpendicular to the direction in which the row of cavities 21 extends; and by two opposite, respectively top and bottom, end walls 30, 31 with reference to the position of connector 2 in the accompanying drawings.

Connector 2 also comprises four elastic retaining members 32 carried in pairs on top and bottom end walls 30 and 31 of casing 20, and which click onto the lateral edge of opening 14 on supporting member 4.

More specifically, retaining members 32 on each end wall 30, 31 are located on opposite sides of a plane of symmetry of connector 2 perpendicular to end walls 30, 31 and to rear and front walls 27, 28, and extend close to respective lateral walls 29.

Each retaining member 32 comprises a rectangular elastic lance 33 extending integrally from relative end wall 30, 31; and two retaining teeth 34, 35 projecting from lance 33, located in succession in direction A, and respectively defining a first and a second connection position of connector 2 to supporting member 4.

More specifically, each lance 33 is detached from relative end wall 30, 31 along three sides forming a U-shaped slot, and is therefore hinged to relative end wall 30, 31 along the fourth side.

As shown in FIG. 4, teeth 34 are located downstream from respective teeth 35 with reference to direction A, and have a lateral profile in the form of a right triangle. More specifically, each tooth 34 is defined at the front by a side 36 sloping with respect to relative end wall 30, 31 to permit insertion of casing 20 inside opening 14 of supporting member 4 in direction A, and at the rear by a straight side 37 extending parallel to a plane perpendicular to direction A and defining a stop surface for the lateral edge of opening 14 of supporting member 4 to prevent withdrawal of connector 2 from supporting member 4 in the opposite direction to direction A.

The straight sides 37 of teeth 34 define the first connection position of casing 20 to supporting member 4.

Teeth 35 are contiguous to respective teeth 34, have a triangular profile, and are each defined by a front side 38 and a rear side 39, which are oppositely inclined and slope with respect to end walls 30, 31.

Side 38 of each tooth 35 slopes with respect to end wall 30, 31 less steeply than the corresponding rear side 39 to enable casing 20 to be inserted easily inside opening 14 of supporting member 4 in direction A.

Sides 39 of teeth 35 define stop surfaces for the lateral edge of opening 14 of supporting member 4, and, for limited load values depending on the slope of sides 39 with respect to relative end wall 30, 31, prevent withdrawal of connector 2 from supporting member 4 in the opposite direction to direction A. Sides 39 of teeth 35 thus define the second connection position of casing 20 to supporting member 4.

The angle defined between sides 39 of teeth 35 and a plane perpendicular to direction A is advantageously so selected as to only allow casing 20 to be moved, with respect to supporting member 4 and in a direction opposite direction A, into the first connection position by loads greater than the load required to connect connectors 2 and 3.

In other words, by virtue of the slope of sides 39, teeth 35 may be likened to limited-load retaining members detachable from the edge of opening 14 by loads greater than the load required to connect connectors 2 and 3, so that casing 20 can be moved with respect to supporting 4 in the opposite direction to direction A, in the event connectors 2 and 3 are fully connected before supporting members 4 and 5.

The distance between the first and second connection position, measured parallel to direction A, i.e. the length of side 38 of each tooth 35, is at least equal to the maximum assembly tolerance in direction A of supporting members 4 and 5. Preferably, said distance is so selected as to keep sides 38 of teeth 35 pressed against the lateral edge of opening 14 of supporting member 4, and is therefore selected greater than said maximum assembly tolerance.

Connector 2 also comprises four stop members 40 (FIGS. 3 and 4), which project outwards in pairs from top and bottom end walls 30, 31 of casing 20, are located close to rear wall 27 and facing respective retaining members 32, and cooperate with the lateral edge of opening 14 of supporting member 4 to prevent casing 20 from moving beyond the second connection position in direction A.

In the example shown, stop members 40 comprise respective outer projections of end walls 30, 31, and are located on the opposite side of teeth 35 to teeth 34. More specifically, each stop member 40 is spaced apart from the respective adjacent tooth 35, and has a lateral profile substantially in the form of a right-angle trapezium with the oblique side facing side 39 of tooth 35.

Connector 2 also comprises two projections 41, which project outwards from respective end walls 30, 31 of casing 20, extend close to front wall 28, are ach located in an intermediate position between retaining members 32 of the relative end wall 30, 31, and, as explained in more detail later on, provide for centering connector 2 with respect to direction A at a first stage in the connection to connector 3.

Figure 5:
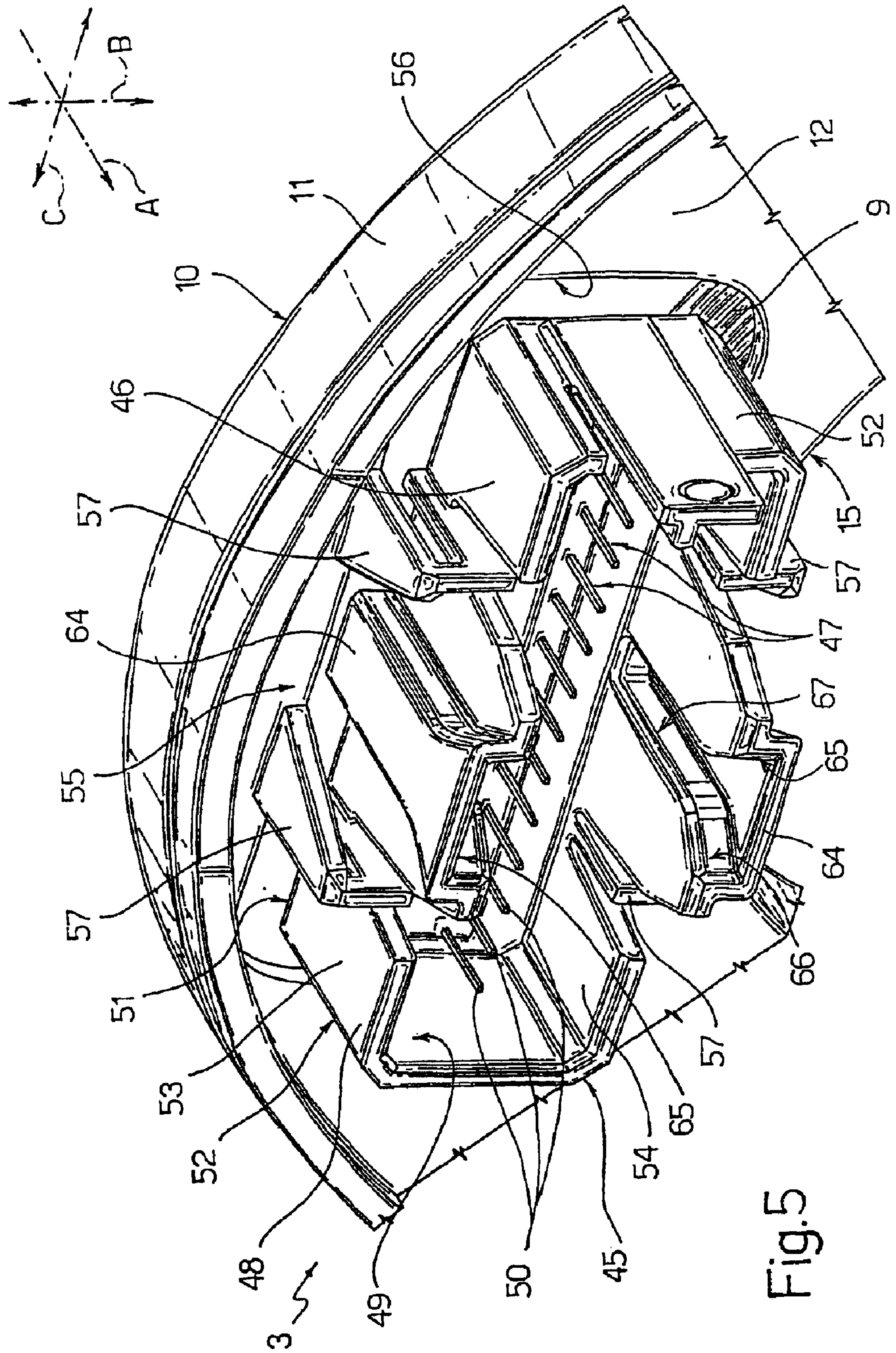
FIG. 5 shows a larger-scale view in perspective of the FIG. 1 jack connector prior to connection to the plug connector.

With reference to FIG. 5, jack connector 3 comprises a substantially parallelepiped-shaped insulating casing 45 in turn comprising a rear portion 46 having a number of longitudinal through cavities (not shown) for housing respective male electric terminals 47, and a hollow front portion 48 communicating with said cavities and defining a substantially parallelepiped-shaped compartment 49 for housing casing 20 of connector 2.

Like connector 2, terminals 47 and, therefore, the respective cavities housing them, have respective axes parallel to direction A, and are aligned in one row crosswise to direction A.

Each terminal 47 (FIG. 5) is welded at one end to flexible circuit 9, and has, at the opposite end, a pin-type contact portion 50 projecting inside compartment 49.

Casing 45 is defined by a rear wall 51 from which flexible circuit 9 projects; by two opposite lateral walls 52 parallel to direction A and perpendicular to the direction in which the row of terminals 47 extends; and by two opposite end walls 53, 54—respectively top and bottom with reference to the position of connector 3 in FIG. 5—perpendicular to rear wall 51 and lateral walls 52.

Figure 6:
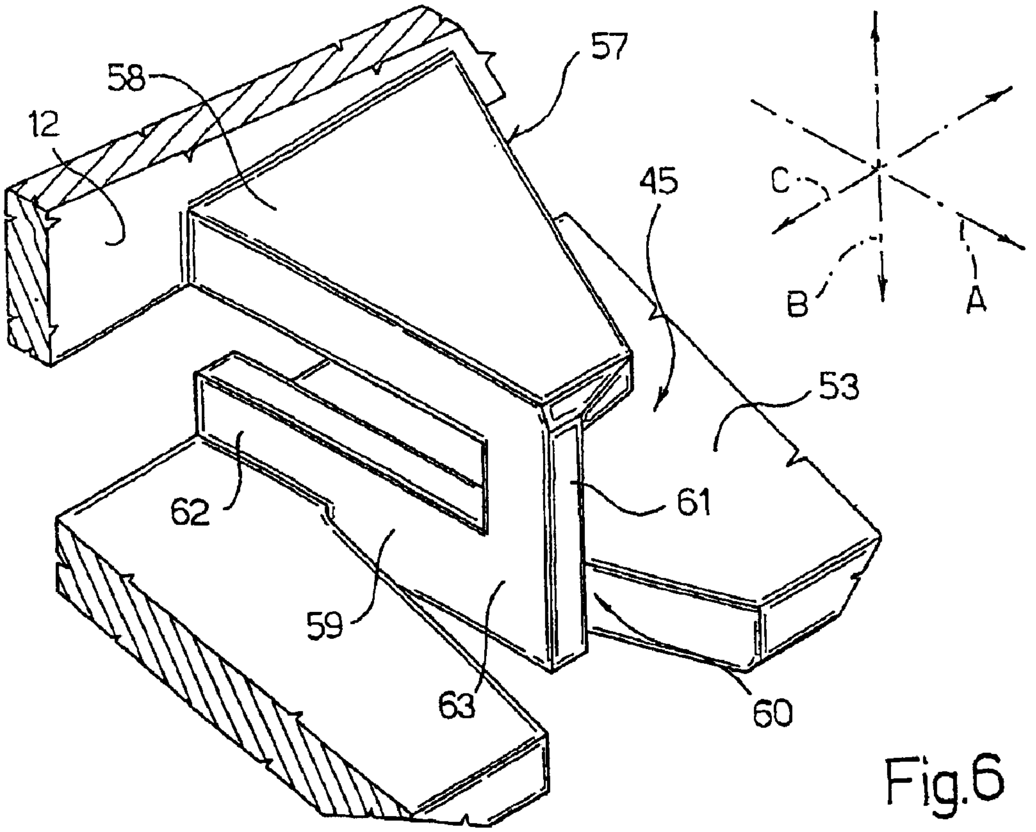
FIG. 6 shows a larger-scale view in perspective of a detail of the FIG. 5 jack connector.

As shown in FIGS. 5 and 6, casing 45 is connected to plate 12 of box body 10 by elastic connecting means 55, which are flexible in two directions B, C perpendicular to each other and to direction A to align casing 45 correctly with casing 20 of connector 2 in the event, during connection, of any angular misalignment of supporting members 4 and 5 with respect to direction A.

More specifically, casing 45 is suspended by elastic connecting means 55 from the lateral edge of a rectangular round-cornered through opening 56 in plate 12, and is positioned with rear wall 51 facing opening 56.

Elastic connecting means 55 comprise four leaf spring members 57 which project outwards in pairs from top and bottom end walls 53, 54 of casing 45, are connected to respective straight portions, adjacent and parallel to walls 53, 54, of the lateral edge of opening 56, and allow casing 45 to move parallel to itself in directions B and C with respect to plate 12.

Leaf spring members 57 of each end wall 53, 54 are located on opposite sides of a plane of symmetry of connector 3 perpendicular to end walls 53, 54 and to rear wall 51, and are located close to respective lateral walls 52.

More specifically, each leaf spring member 57 comprises a first portion 58 projecting in direction A from the lateral edge of opening 56 in plate 12 and flexible in direction B; a second portion 59 fixed to relative end wall 53, 54 of casing 45 and partly and loosely engaging a respective opening 60 in end wall 53, 54 so as to flex in direction C; and a third portion 61 connecting respective front ends of portions 57, 58 substantially rigidly.

More specifically, portion 58 of each leaf spring member 57 is defined by a flat, substantially trapezoidal tab of a height, measured in direction B, smaller than its length and width measured respectively in directions A and C, so as to flex solely in direction B. More specifically, portion 58 decreases in width from plate 12.

Portion 59 of each leaf spring member 57 is defined by a substantially parallelepiped-shaped bar of a width, measured in direction C, smaller than its length and height measured respectively in directions A and B, so as to flex solely in direction C.

Portion 59 also comprises a rear portion 62 facing plate 12 and fixed to relative end wall 53, 54; and a front portion 63 engaging relative opening 60 loosely in direction C. More specifically, each opening 60 is substantially V-shaped and decreases in section towards plate 12 from a front edge of relative end wall 53, 54.

With reference to FIG. 5, each end wall 53, 54 comprises, between relative openings 60, a hollow projecting portion 64, which defines a substantially funnel-shaped seat 65 for receiving a respective projection 41 of connector 2, and interacts with projection 41 to align casing 45, by virtue of the flexibility of leaf spring members 57, with casing 20 of connector 2 when connecting supporting members 4 and 5 in direction A.

More specifically, in the event, during connection, of any angular misalignment of supporting members 4 and 5 with respect to direction A, the interaction of projections 41 of connector 2 and respective projecting portions 64 of connector 3 moves casing 45 with respect to plate 12 in one or both directions B and C until casing 45 and casing 20 of connector 2 are aligned correctly.

Each seat 65 comprises an inlet portion 66 increasing in section in direction A; and a substantially constant-section end portion 67 extending from the minimum-section end of inlet portion 66 in the opposite direction to direction A.

Inlet portion 66 of each seat 65 is formed in a front portion of projecting portion 64 projecting in direction A from an inlet opening of compartment 49, so that projecting portion 64 and respective projection 41 of connector 2 begin interacting before casing 20 is inserted inside casing 45.

When connecting connectors 2 and 3, projecting portions 64 fit through respective recesses 68 formed in opposite straight portions of the lateral edge of opening 14 of supporting member 4, and, following connection, project partly with respect to supporting member 4 on the opposite side of plate 12.

Connecting unit 1 is assembled as follows.

First of all, connector 2 is inserted in direction A through opening 14 of supporting member 4 into the second connection position. More specifically, when inserting casing 20 through supporting member 4, the oblique sides 36, 38 of teeth 34, 35 slide on the lateral edge of opening 14 to flex lances 33 inwards of casing 20; and, once teeth 35 get past supporting member 4, respective lances 33 spring back to the undeformed position and rear sides 39 of teeth 35 define stops preventing withdrawal of connector 2 in the opposite direction to direction A.

Any further movement of connector 2 in direction A is prevented by the lateral edge of opening 14 of supporting member 4 interacting with stop members 40.

At this point, supporting member 4 is pushed in direction A towards supporting member 5 so that projections 41 of connector 2 are inserted inside inlet portions 66 of seats 65 on connector 3. At this stage, casing 20 is still located outside compartment 49 of casing 45.

If, owing to their own assembly tolerances, supporting members 4 and 5 are misaligned angularly with respect to direction A, projections 41 of connector 2 interact with respective projecting portions 64 of connector 3 to move casing 45 with respect to plate 12 in one or both directions B and C until casing 45 is aligned correctly with casing 20 of connector 2.

By virtue of inlet portions 66 of seats 65 of casing 45 projecting frontwards in direction A with respect to compartment 49, casings 20 and 45 can be aligned correctly before they engage each other.

Casing 45 is moved with respect to plate 12 by virtue of leaf spring members 57 flexing in directions B and C. Since casing 45 is connected to plate 12 at four points, and since leaf spring members 57 are defined by two portions 58, 59, each flexible in relative direction B, C but substantially rigid in the flexing direction C, B of the other portion, casing 45 can only move parallel to itself and is therefore prevented from tilting with respect to direction A.

As supporting member 4 is pushed further in direction A, supporting member 4 is connected to supporting member 5 and casing 20 of connector 2 is inserted fully inside casing 45 of connector 3.

At this stage, if, owing to the assembly tolerances of steering module 6, connectors 2 and 3 are fully connected before supporting members 4 and 5, casing 20 of connector 2 is subjected, at the final assembly stage, to a thrust greater than the retaining load of teeth 35 and which moves casing 20 into the first connection position. Lances 33 flex inwards of casing 20, and rear sides 39 of teeth 35 allow casing 20 to move with respect to supporting member 4 into the first connection position; and connector 2 can be fixed to supporting member 4 in any position between the first and second connection position.

Conversely, if connectors 2 and 3 are fully connected simultaneously with supporting members 4 and 5, connector 2 remains fixed to supporting member 4 in the second connection position.

The advantages of connector 2 according to the present invention will be clear from the foregoing description.

In particular, by virtue of connector 2 being fitted to relative supporting member 4 beforehand in a connection position defined by limited-load retaining means (teeth 35), if connectors 2 and 3 are fully connected in direction A before supporting members 4 and 5, connector 2 can be moved in the opposite direction to direction A into an adjacent connection position (teeth 34), thus enabling connectors 2 and 3 to be connected correctly even in the event of assembly tolerances of supporting members 4 and 5 in direction A.

Clearly, changes may be made to connector 2 without, however, departing from the scope of the present invention.

What is claimed is:

1. An electric connector connectable to a first supporting member, cooperating with a complementary electric connector in turn carried by a second supporting member, and connectable to the complementary connector by connecting said first and said second supporting member in an assembly direction (A); said connector comprising an outer casing defining at least one cavity for housing a respective electric terminal and having connecting means for connection to said first supporting member characterized that said connecting means comprise limited-load retaining means configured for retaining said casing with respect to the assembly direction in a substantially fixed predetermined position relative to the first supporting member when the limited load retaining means are loaded by connector connection loads to a first predetermined load limit of the limited-load retaining means, the first predetermined load limit being adequate for effecting complete connection between the connector and complementary connector, wherein the limited load retaining means are releasable by loads greater than the first predetermined load limit, so as to enable displacement of said casing with respect to said first supporting member from said predetermined position in an opposite direction to said assembly direction (A).

2. An electrical connector connectable to a first support member, cooperating with a complementary electric connector in turn carried by a second supporting member, and connectable to the complementary connector by connecting said first and said second supporting member in an assembly direction (A); said connector comprising an outer casing defining at least one cavity for housing a respective electric terminal and having connecting means for connection to said first supporting member; characterized in that said connecting means comprise limited-load retaining means releasable by load greater than the load required to connect said connector and the complementary connector, so as to enable displacement of said casing with respect to said first supporting member in an opposite direction to said assembly direction (A) in the event connection of said connector to the complementary connector is completed before said first and said second supporting member are connected and characterized in that said connecting means comprise first and second retaining means located successively in said assembly direction (A) and respectively defining a first and second connection position of said connector to said first supporting member; said second retaining means being located upstream from said first retaining means in said assembly direction (A) and defining said limited-load retaining means.

3. The connector as claimed in claim 2, characterized in that the distance, measured parallel to said assembly direction (A), between said first and said second connection position is at least equal to the maximum assembly tolerance, in the assembly direction (A), of said first and said second supporting member.

4. The connector as claimed in claim 2, characterized in that said casing is fitted through a through opening in said first supporting member; and in that said first and second retaining means comprise at least a first and a second tooth respectively, which project from a relative elastic lance carried by an outer wall of said casing, and click onto the lateral edge of said opening in said first supporting member to define the relative said first and second connection positions.

5. The connector as claimed in claim 4, characterized in that said first tooth has a front side sloping with respect to said outer wall of said casing to permit insertion of the casing inside said opening in said first supporting member in said assembly direction (A); and a rear side extending parallel to a plane perpendicular to said assembly direction (A), and which rests against the lateral edge of said opening in said first supporting member to define said first connection position.

6. The connector as claimed in claim 4, characterized in that said second tooth has a front side sloping with respect to said outer wall of said casing to permit insertion of the casing inside said opening in said first supporting member in said assembly direction (A); and a rear side sloping with respect to said outer wall of said casing in the opposite direction to the relative said front side, defining said second connection position, and sloping at such an angle as to enable said connector to be moved from said second connection position to said first connection position by loads greater than the load required to connect said connector and the complementary connector.

7. The connector as claimed in claim 2, characterized in that said casing is provided externally with stop means located on the opposite side of said second retaining means with respect to said first retaining means, and cooperating with the lateral edge of said opening in said first supporting member to prevent said casing from moving beyond said first connection position in said assembly direction (A).

8. The connector as claimed in claim 7, characterized in that said stop means comprise at least one projection extending from said outer wall of said casing and facing said second tooth.

9. The connector as claimed in claim 4, characterized in that said casing is substantially parallelepiped-shaped, and comprises four said elastic lances having respective said first and second teeth and carried in pairs by respective opposite outer walls of the casing.

* * * * *